Oct. 2, 1923.
P. J. SITTER
1,469,276
COMBINATION PIPE AND CIGARETTE HOLDER
Filed July 21, 1922    2 Sheets-Sheet 1
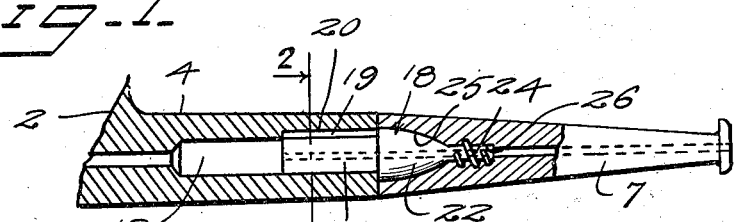
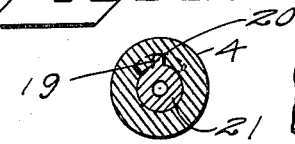
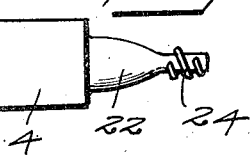
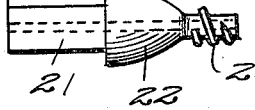
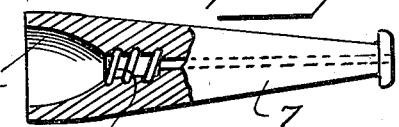
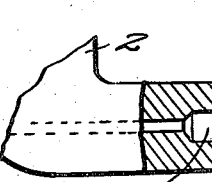
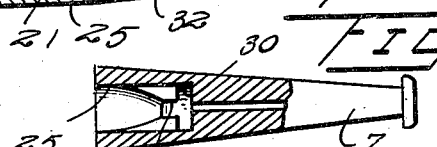
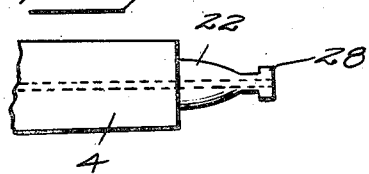
Inventor
Paul J. Sitter
By William J. Jacobi
Attorney Oct. 2, 1923.
P. J. SITTER
1,469,276
COMBINATION PIPE AND CIGARETTE HOLDER
Filed July 21, 1922   2 Sheets-Sheet 2
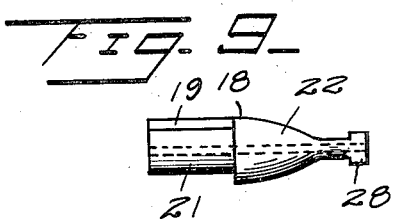
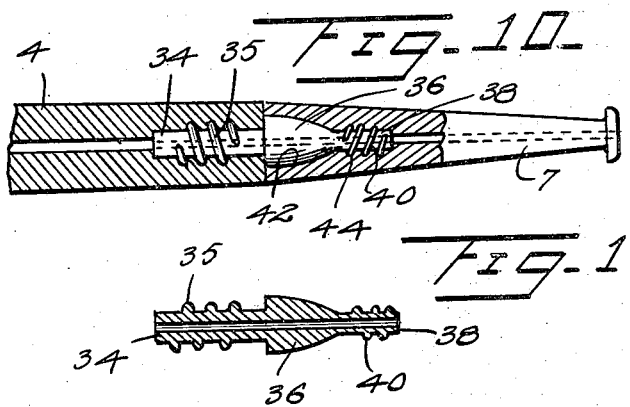
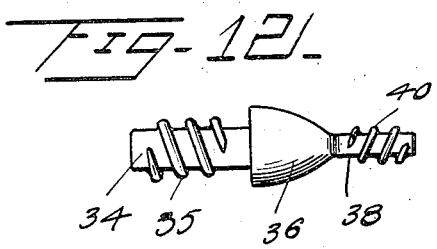
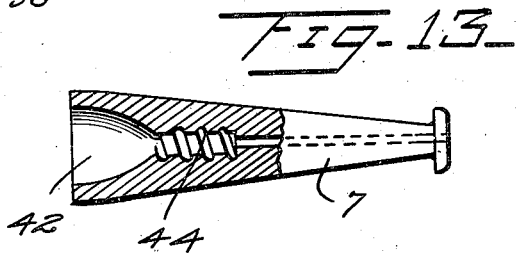
Inventor
Paul J. Sitter.
By William J. Jacolie
Attorney Patented Oct. 2, 1923.

1,469,276

UNITED STATES PATENT OFFICE.

PAUL J. SITTER, OF OSHKOSH, WISCONSIN.

COMBINATION PIPE AND CIGARETTE HOLDER.

Application filed July 21, 1922. Serial No. 576,521.

*To all whom it may concern:*

Be it known that PAUL J. SITTER, a citizen of the United States, residing at Oshkosh, in the county of Winnebago and State of Wisconsin, has invented certain new and useful Improvements in Combination Pipes and Cigarette Holders, of which the following is a specification.

This invention relates to a combination pipe and cigarette or cigar holder, one of the features of novelty of which resides in a construction which permits the stem of the pipe to be detached when required and used as a cigar or cigarette holder as the case may be, while other features reside in the particular forms of the union or coupling for connecting the stem and pipe.

Figure 1 is a longitudinal sectional view through a pipe and stem illustrating one form of the coupling device;

Figure 2 is a transverse sectional view on the line 2—2 of Figure 1;

Figure 3 is a side elevation of one end of a pipe stub-stem with the coupling device inserted therein;

Figure 4 is a side elevation of one form of coupling device;

Figure 5 is a partial sectional view of a combined pipe stem and cigar holder with which the coupling device shown in Figure 4 is adapted for use;

Figure 6 is a longitudinal sectional view of a pipe with a modified form of coupling;

Figure 7 is a partial sectional view of a pipe stem for use therewith;

Figure 8 is a side elevation of the coupling device of Figure 6 integral with the stub-stem;

Figure 9 is a side elevation of the coupling device shown in Figure 6;

Figure 10 is a sectional view through a pipe stem showing another modification of coupling device;

Figure 11 is a longitudinal sectional view of said coupling device;

Figure 12 is a side elevation of the coupling device shown in Figure 11; and

Figure 13 is a partial sectional view of a combined cigar holder and pipe stem with which the coupling device shown in Figures 11 and 12 is used.

In the form shown in Figures 1, 2, 3 and 4, the pipe bowl is shown at 2, the stub-stem at 4 and the combined stem and cigarette or cigar holder at 7, and the union or coupling is formed as a separate unit and embodies an axially bored member 18 of uniform cross-section throughout a major portion of its length, and which portion 21 is provided with a longitudinal key or rib 19 which co-operates with a slot or groove 20 in the bore 12 of the stub stem 4 to prevent relative rotative movement between the assembled parts.

The other end of the union terminates in a nipple 22 having a screw threaded extension 24, which nipple 22 and extension 24 are adapted to respectively cooperate with correspondingly formed recesses and screw threaded portions 25 and 26 of the stem 7.

Referring now to the modification shown in Figures 6, 7, 8 and 9, the section 21 of the union or coupling 18 is identical with that in Figures 1 and 2, the present form departing in the construction of the means associated with the nipple 22 for connecting with the pipe stem 7. As here shown, the nipple 22 is provided with a T-shaped extension 28 which cooperates with a correspondingly formed slot 30 formed at the inner terminus of the outwardly tapered recess 25 in said stem. The neck 32 which joins the slot 30 and the recess 25 is of a height slightly greater than that of the T-shaped extension and arranged at right angles to said slot 30 so that it is necessary to turn the coupling and stem on their axes relatively through an angle of 90 degrees in assembling and disassembling the parts. Figure 8 illustrates the nipple 22 and its T-head extension formed integrally with the stub-stem 4.

In the modification shown in Figures 10, 11, 12 and 13, I have shown a union or coupling 34 which comprises an axially bored member, one end of which is of uniform cross section and provided with an external right hand thread 35, while the other end is enlarged and formed as a nipple 36 having a reduced extension 38 of uniform cross section throughout its length, provided with an external left-hand screw-thread 40. The bore of the stub-stem 4 is threaded to correspond with the screw threaded portion 35 of the coupling while the stem 7 is recessed and screw threaded as at 42 and 44 to cooperate with the nipple 36 and threaded portion 38 respectively.

It will be observed that in all forms, the stub-stem and pipe stem are in abutting relation so that no portion of the coupling member is exposed.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention in a manner which will enable others and especially those skilled in the art to understand the construction and operation thereof, what I claim as new and desire to protect by Letters Patent is:—

1. In a device as described, a stub-stem having a longitudinal groove, and a separable coupling device comprising an axially bored member having one end thereof provided with a longitudinal rib adapted to snugly fit within said longitudinal groove and the other end provided with a pipe stem engaging portion.

2. A separable coupling device for pipes and stems comprising an axially bored member having one end thereof provided with a locking and guide rib and the other end provided with a tapered nipple terminating in a pipe stem engaging portion.

3. In a device as described, a stub-stem having a longitudinal groove, and a separable coupling device comprising an axially bored member having one end thereof provided with a longitudinal rib adapted to snugly fit within said longitudinal groove and the other end provided with a tapered nipple terminating in a threaded pipe stem engaging portion.

In testimony whereof I affix my signature.

PAUL J. SITTER.